March 11, 1952 — W. A. HERTZ — 2,589,081
LUBRICATING DEVICE
Filed July 23, 1949
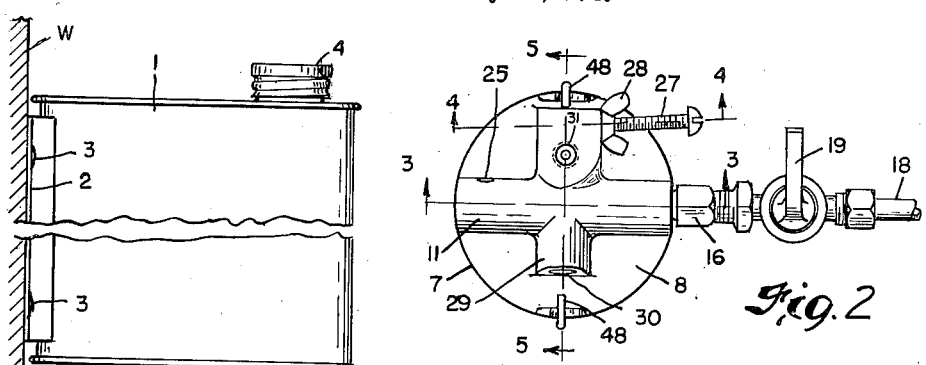
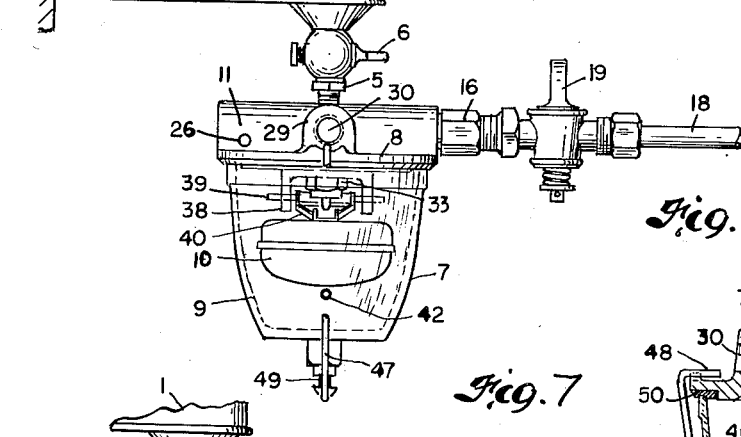
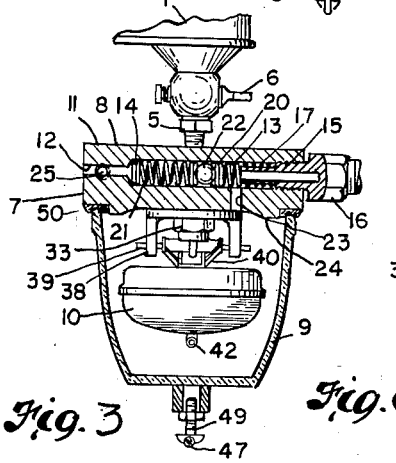
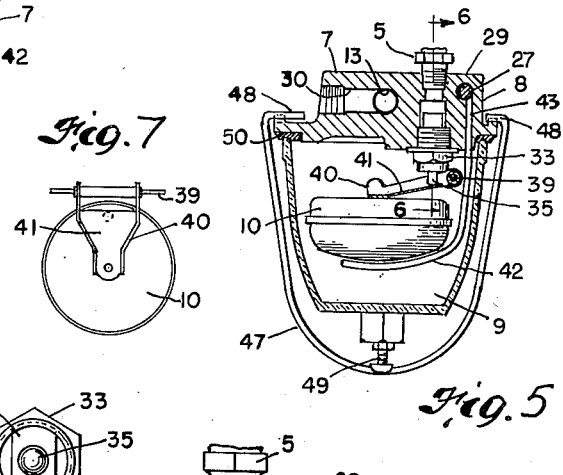
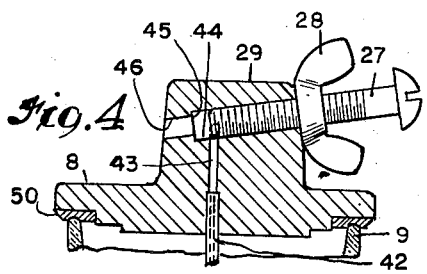
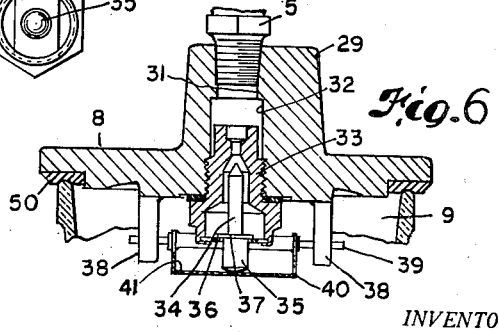
INVENTOR.
WILLIAM A. HERTZ
BY
William Isler
ATTORNEY Patented Mar. 11, 1952

2,589,081

UNITED STATES PATENT OFFICE 2,589,081

LUBRICATING DEVICE

William A. Hertz, Shaker Heights, Ohio

Application July 23, 1949, Serial No. 106,375

2 Claims. (Cl. 123—196)

This invention relates to a lubricating device and more specifically to a lubricator for the valves and upper cylinder walls of an internal combustion engine such as is used to power automobiles and trucks.

It is the primary object of my invention to provide a lubricator which will be effective to inject a suitable liquid lubricant into the upper cylinder area of an internal combustion engine, including the valves and pistons, this being the area which under prevailing design practices receives insufficient lubrication.

Another object of my invention is to provide a lubricator which automatically injects the lubricant in response to changes in load on the engine.

Still another object of my invention is to provide a lubricator which is actuated by changes in the pressure in the intake manifold of the engine.

A further object of my invention is to provide a lubricator which is adapted to be easily installed on existent forms of auto and truck engines.

Still another object of my invention is to provide a lubricator which is composed of a minimum of parts and which is durable and efficient in its operation.

Other objects and advantages of the invention will be apparent during the course of the following description.

In the accompanying drawings, forming a part of this specification, and in which like numerals are employed to designate like parts throughout the same, Fig. 1 is an elevational view of a lubricating device embodying the features of my invention.

Fig. 2 is a top plan view of the lubricator shown in Fig. 1.

Fig. 3 is a cross-sectional view, taken on line 3—3 of Fig. 2.

Fig. 4 is a fragmentary enlarged cross-sectional view, taken on line 4—4 of Fig. 2.

Fig. 5 is a cross-sectional view, taken on line 5—5 of Fig. 2.

Fig. 6 is an enlarged cross-sectional view of the needle valve taken on line 6—6 of Fig. 5.

Fig. 7 is a top plan view of the float assembly, and

Fig. 8 is a bottom plan view of the needle valve assembly.

Referring in more detail to the drawings, I provide an oil reservoir 1 having a bracket member 2 formed thereon which is adapted to be secured to a wall W of the engine housing by means of screws or bolts 3. The reservoir may be in the form of a metal container having a removable closure 4 which permits the container to be replenished with oil as the need arises.

On the underside of the reservoir 1 is provided a threaded outlet pipe 5 and a valve 6. The valve 6 is normally fully opened, and would be closed only if it were necessary to detach the lubricator from the reservoir for inspection, repair or the like.

The lubricator, indicated generally by the numeral 7, consists of three major components, a cover 8, a bowl 9 and a float 10.

The cover 8 is substantially circular in form and is preferably formed by casting. A cylindrical boss 11 extends diametrically across the cover and is bored to form a passageway or channel 12 which is counterbored to form a larger channel 13, thereby forming an annular shoulder 14 at the juncture between channels 12 and 13.

The open end of channel 13 is tapped to form threads 15 which engage a threaded pipe fitting 16 having a tubular extension 17 of reduced diameter which extends into bore 13. The fitting is connected to a conduit 18 which in turn leads to the intake manifold of an internal combustion engine. A valve 19 is interposed between the fitting 16 and the conduit 18 to permit shut-off when desired.

A light coil spring 20 is carried on the extension 17 and another similar spring 21 is seated against the shoulder 14 of the bore 13. A steel ball 22 is interposed between the adjacent ends of springs 20 and 21, the ball being biased by the springs to a neutral position, i. e., a position of equilibrium. The ball 22 serves as a valve as will more fully appear hereinafter.

An opening 23 is formed in the underside 24 of the cover 8, this opening being at right angles to the longitudinal axis of bore 13 and communicating therewith and with the interior of bowl 9.

Two openings 25 and 26 are formed in the boss 11 at right angles to the longitudinal axis of bore 12 and in communication therewith, the opening 26 being, in effect, a continuation of opening 25.

The cover 8 is provided with a second boss 29 which is disposed at right angles to the boss 11 and traverses said boss. One portion of the boss 29 is bored longitudinally and tapped to provide a channel or opening 30 which terminates in communication with the bore 13. The other portion of boss 29 is provided with a vertically extending bore 31 which is threaded internally to receive the outlet pipe 5.

The bore 31 is counterbored as at 32 and internally threaded to receive a conventional needle valve assembly 33. The movable needle plunger 34 has an enlarged head 35 which projects downwardly into the interior of bowl 9, the plunger being limited in its downward movement by a retainer plate 36 which forms part of the assembly 33 and which underlies a circumferential flange 37 formed on the plunger 34.

On the underside 24 of the cover 8, two spaced depending ears 38 are provided, the ears being equidistant from the needle valve assembly 33. The ears are adapted to receive a hinge pin 39 on which is pivotally mounted a cam plate 40 which is unitary with the float 10. The plate 40 has a central web portion 41 which underlies the head 35 of the needle plunger 34 whereby the plunger is caused to move vertically in response to pivotal movement of the cam plate 40 as actuated by the float 10.

Downward movement of the float 10 is limited by a curved piece of hollow tubing 42 which underlies the float 10 and serves as a rest therefor.

One end of the tubing 42 is secured in a vertical bore or vent opening 43 formed in the cover 8, this bore in turn communicating with a transverse bore 44 formed in the boss 29. The other end of the tubing 42 underlies the float substantially at the center thereof. The bore 44 is tapped to receive an adjusting screw 27 which can be seated on an annular shoulder 45 formed by juncture of the bore 44 with a smaller bore 46. A wing nut 28 serves as a lock nut to retain the screw 27 in position.

The bowl 9 is secured to the cover 8 by means of a clamp yoke 47 having hooked ends 48 which overlie the cover. The central portion of the yoke is provided with adjusting means 49 which serve to tension the yoke 47 and secure the bowl firmly against the cover.

A gasket 50 is provided intermediate the bowl and the underside 24 of the cover so as to effect a seal at this juncture.

The structure and arrangement of the various parts having been thus described, I will now describe the operating and functioning of the lubricator.

The lubricant or oil is stored in the reservoir 1 and flows by gravity through the needle valve assembly 33 into the bowl 9. When the bowl is almost completely filled, the float 10 acts to move the plunger 34 upwardly thereby closing the valve and stopping the further flow of oil from the reservoir. It will be understood that as oil is removed from the bowl 9, in the manner hereinafter described, the float will be lowered and when a predetermined level of oil is reached, the needle valve will open to replenish the oil in the bowl.

During the operation of an internal combustion engine, a vacuum is created in the intake manifold, as is well known in the art. The degree of vacuum which exists in the manifold, varies in response to various factors, including the load on the engine and the throttle manipulation.

The vacuum is quite high during the initial starting period, is relatively low during periods of acceleration or increased load, such as hill climbing, and is relatively high during steady operation, as when the desired speed has been attained or when the motor is idling.

The spring 20 is of such predetermined strength, that the force exerted thereby is sufficient to maintain the ball 22 in approximately neutral position during the time when the manifold vacuum is low. However, when the vacuum becomes high, the atmospheric pressure on ball 2 causes the ball to compress spring 20 and move toward the opening in extension 17 where it finally abuts causing the opening to be substantially sealed.

Thus when the engine is started, a high degree of vacuum exists which is communicated to the bore 13 through conduit 18. Air, which is free to enter through bore 12 and openings 25, 26 causes ball 22 to seal the end of extension 17 in opposition to the action of spring 20.

As the speed of the engine is accelerated, as would occur when shifting gears, the vacuum in the manifold decreases and the spring 20 moves the ball 22 toward neutral position.

Inasmuch as the flow of air through opening 12 is limited, air is drawn from the interior of bowl 9 through opening 23 which communicates with bore 13.

The exhausting of air from bowl 9 causes a surge of air to flow into the bowl through tube 42 which is open to the atmosphere through opening or bore 46. The air enters the lubricant substantially at the center of the float and impinges on the float 10 so that it is dispersed thereby. The sudden inrush of air agitates and atomizes the oil, and small globules of oil are carried by the stream of air into opening 23 at which point the globules are further broken up by admixture with the stream of air entering bore 13 from opening 12. The oil and air mixture are then drawn into the intake manifold through conduit 18.

As soon as the engine has attained a constant speed, that is, when no acceleration is taking place, the vacuum in the manifold increases (the pressure decreases) and the ball 22 is once more sucked or drawn toward the extension 17 to block the opening and no further flow of oil takes place out of bowl 9.

It will be understood that each time the engine is accelerated, lubricant will be injected into the manifold by reason of the aforesaid surge of air through tube 42. The adjusting screw 27 in bore 44 is effective to control the rate at which air is permitted to bleed into bowl 9 through tube 42, and thereby control the rate at which the oil is drawn out of the bowl.

It will be understood that the lubricating effect will also occur if an increased load is placed on the engine such as when an automobile is ascending a grade.

The oil which is thus metered to the manifold mixes with the fuel mixture and is carried with the fuel into the combustion chamber, thereby lubricating the valves, the pistons and the upper cylinder walls.

The oil which is used is preferably a vegetable oil, instead of a mineral oil, as vegetable oil will withstand higher temperatures.

Thus, I have provided a lubricating device which meters oil to the upper cylinders of an engine automatically in response to changing conditions of pressure in the intake manifold. Thereby an excess of lubrication is avoided which would quickly exhaust the oil supply containable in the reservoir, and yet the engine is lubricated at frequent intervals.

A windshield wiper hose (not shown) may be attached to the opening 30 by means of suitable fittings.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, I claim:

1. In a lubricating device of the character described, the combination of a lubricant-containing bowl, a lubricant reservoir communicating with said bowl, a float mounted movably in said bowl, a valve interposed between said reservoir and said bowl and operatively connected to said float, whereby to control the flow of lubricant from said reservoir to said bowl in response to changes in the level of lubricant in said bowl, a vacuum line communicating with said bowl, and a vent tube mounted in said bowl in underlying relationship to said float with the outlet end thereof substantially at the center of said float and effective to discharge air into said lubricant in response to the decreased pressure in said bowl, said float being effective to disperse said discharged air whereby to atomize said lubricant and cause it to be carried into said vacuum line.

2. A combination as defined in claim 1 wherein said vent tube abuts said float to arrest movement of said float at the lower limit thereof.

WILLIAM A. HERTZ.

REFERENCES CITED

The following references are of record in the file of this patent:

UNITED STATES PATENTS

| Number | Name | Date |
|---|---|---|
| 1,896,421 | Quivey | Feb. 7, 1933 |
| 2,079,676 | Carson | May 11, 1937 |
| 2,112,538 | Loughlin | Mar. 29, 1938 |